United States Patent
Rigney

(10) Patent No.: US 6,226,918 B1
(45) Date of Patent: May 8, 2001

(54) ARTIFICIAL BAIT WITH BREAKAWAY SEGMENTS FOR SELECTABLE DROP RATES

(76) Inventor: Jan Jay Rigney, Rte. 6 Box 11, Claremore, OK (US) 74018

( * ) Notice: Subject to any disclaimer, the term of this patent is extended or adjusted under 35 U.S.C. 154(b) by 0 days.

(21) Appl. No.: 08/790,501

(22) Filed: Jan. 29, 1997

(51) Int. Cl.$^7$ ................................................ A01K 85/00
(52) U.S. Cl. ................................................................ 43/42.24
(58) Field of Search .......................... 43/42.22, 42.24, 43/42.26, 42.28, 42.29, 42.39

(56) References Cited

U.S. PATENT DOCUMENTS

| | | | |
|---|---|---|---|
| 12,060 | 12/1854 | Hoard . | |
| 1,316,040 | 9/1919 | Jamison . | |
| 2,129,245 | 9/1938 | Strenstrom | 43/46 |
| 2,231,949 | 2/1941 | Rinehart | 43/48 |
| 2,274,596 | 2/1942 | Fink | 43/46 |
| 2,289,096 | 7/1942 | Brett | 43/47 |
| 2,715,790 | 8/1955 | Carpenter | 43/42.09 |
| 2,755,592 | 7/1956 | Bocchino | 43/42.22 |
| 2,797,519 | 7/1957 | Keller | 43/42.06 |
| 2,875,549 | 3/1959 | O'Sullivan | 43/42.22 |
| 2,881,549 | 4/1959 | Bryan | 43/43.15 |
| 3,357,124 | 12/1967 | Stepacoff et al. | 43/42.09 |
| 3,490,165 * | 1/1970 | Thomassin | 43/42.22 |
| 3,608,229 | 9/1971 | Ross | 43/43.14 |
| 3,940,869 | 3/1976 | Roberts | 43/42.53 |
| 3,973,349 | 8/1976 | England | 43/42.03 |
| 4,155,191 * | 5/1979 | Spivey | 43/42.22 |
| 4,202,128 | 5/1980 | Hill et al. | 43/43.14 |
| 4,229,899 | 10/1980 | McGahee | 43/42.09 |
| 4,477,996 | 10/1984 | Walter | 43/43.14 |
| 4,571,874 | 2/1986 | Smaw | 43/4.5 |
| 4,689,914 | 9/1987 | Quinlar | 43/42.22 |
| 4,926,578 | 5/1990 | Morse et al. | 43/42.24 |
| 4,944,112 * | 7/1990 | Germany | 43/42.22 |
| 4,945,669 | 8/1990 | Webel | 43/42.39 |
| 4,980,110 | 12/1990 | Nelson et al. | 264/152 |
| 5,438,790 | 8/1995 | Rigney | 43/42.24 |

* cited by examiner

*Primary Examiner*—Charles T. Jordan
*Assistant Examiner*—Francis T. Palo
(74) *Attorney, Agent, or Firm*—Frank J. Catalano

(57) ABSTRACT

An artificial bait has a body shaped to simulate a natural bait. The bait exhibits a predetermined base drop rate when immersed in water with an attached threshold weight. Means is provided on the body for delineating one or more breakaway segments from the main segment of the body. The breakaway segments are volumetrically calibrated so that, upon removal of any number of breakaway segments from the main segment and immersion in water with the attached threshold weight, the body together with the unremoved breakaway segments has a predetermined drop rate correspondingly faster than the predetermined base drop rate according to the number of breakaway segments removed.

8 Claims, 2 Drawing Sheets

ARTIFICIAL BAIT WITH BREAKAWAY SEGMENTS FOR SELECTABLE DROP RATES

BACKGROUND OF THE INVENTION

This invention relates generally to artificial bait used in fishing and more particularly concerns baits intended to drop at relatively low rates of descent.

Fishermen generally use weights to increase casting distance and accuracy as well as to cause bait to sink and use floats to counter the weight so as to restrict the level to which the bait will sink. In situations where the angler desires for bait to fall from the surface to the bottom at a very slow rate of descent so as to tantalize a fish at any depth therebetween into striking the bait, the counterbalanced relationship is so sensitive that minimal variations in any component prevent achievement of the desired effect.

In my earlier U.S. Pat. No. 5,438,790, a balanced artificial bait is described for use with a typical fishing hook or jig. The hook or jig has an average density greater than the average density of water while the artificial bait has an average density less than the average density of water. Thus, the hook tends to sink and the bait tends to float. However, the volume of the bait is proportioned to the volume of the hook so that their average density taken together slightly exceeds the average density of the water and the hook and the body together sink relatively slowly in the water. Coordinated choices of bait and hook result in rigs of weight suitable for accuracy and distance in casting and yet so counterbalanced for buoyancy as to provide a minimal rate of descent in the water.

While this balanced artificial bait affords an angler a predetermined slow rate of descent, a different bait must be used for each rate of descent selected by the angler. The angler could increase the rate of descent of a given bait by breaking off a portion of the artificial bait. However, if too much of the bait is broken off, the rate of descent will be too fast. Thus the angler must again deal with the problem of adding a counterbalancing weight to the bait to experimentally achieve the desired rate of descent or changing the bait entirely and starting the process anew.

It is, therefore, the primary object of this invention to provide a balanced artificial bait which is readily adaptable to permit selection of any of a plurality of drop rates without changing the bait.

SUMMARY OF THE INVENTION

In accordance with the invention, an artificial bait is provided which has a body shaped to simulate a natural bait. The bait exhibits a predetermined base drop rate when immersed in water with an attached threshold weight. Means is provided on the body for delineating one or more breakaway segments from the main segment of the body. The breakaway segments are volumetrically calibrated so that, upon removal of any number of breakaway segments from the main segment and immersion in water with the attached threshold weight, the body, together with the unremoved breakaway segments, will have a predetermined drop rate which is correspondingly faster than the predetermined base drop rate depending upon the number of breakaway segments removed.

The breakaway segments may extend serially or independently from the main segment. The main segment may simulate a body portion of the natural bait while the breakaway segments simulate portions of appendages of the natural bait. The breakaway segments may be volumetrically equal or otherwise coordinated to provide a proportional change in descent rates. The delineating means may, for example, be changes in color on the surface of the body, changes in contour of the body, lines on the surface of the body or perforations in the body.

BRIEF DESCRIPTION OF THE DRAWINGS:

Other objects and advantages of the invention will become apparent upon reading the following detailed description and upon reference to the drawings in which.

While the invention will be described in connection with several preferred embodiments, it will be understood that it is not intended to limit the invention to these embodiments. On the contrary, it is intended to cover all alternatives, modifications and equivalents as may be included within the spirit and scope of the invention as defined by the appended claims.

DETAILED DESCRIPTION OF THE INVENTION

Turning to the drawings, two embodiments of the artificial bait used in conjunction with a typical hook or jig are illustrated. As used herein, the terms hook and jig are intended to embrace and include modifications or additions such as weights, sinkers, worm weight or other devices added to the hook or jig to increase its average density. The combination of elements is explained in detail in the aforementioned U.S. Pat. No. 5,438,790. The bait to be used in association with the hook or jig may take the form of a crawdad as shown in FIGS. 1 and 2, or a worm, as shown in FIG. 3, or a minnow, frog, or any other natural bait desired by the angler.

As stated in U.S. Pat. No. 5,438,790, the volume of material used in the bait is coordinated with or proportioned to the volume of material in the hook or jig such that the average density of the hook or jig together with the bait is slightly greater than the average density of water. Therefore, in a coordinated arrangement of bait and hook or jig, the bait tends to float or rise to the surface while the hook or jig tends to sink or descend to the bottom, but the combination is so arranged so that the hook or jig and bait taken together in a single rig slowly descend from the surface to the bottom.

Of key significance to the present invention, the bait is formed of a material that is accurately tearable or cutable with scissors, a knife or the like. "Accurately" as used herein means severable along a predetermined line without substantial deviance from that line. "Deviance" is "substantial" if the weight of the severed piece is so different from the weight of the piece defined by the line as to materially impact the expected drop rate of the bait within the intent of this disclosure.

Figure 1:
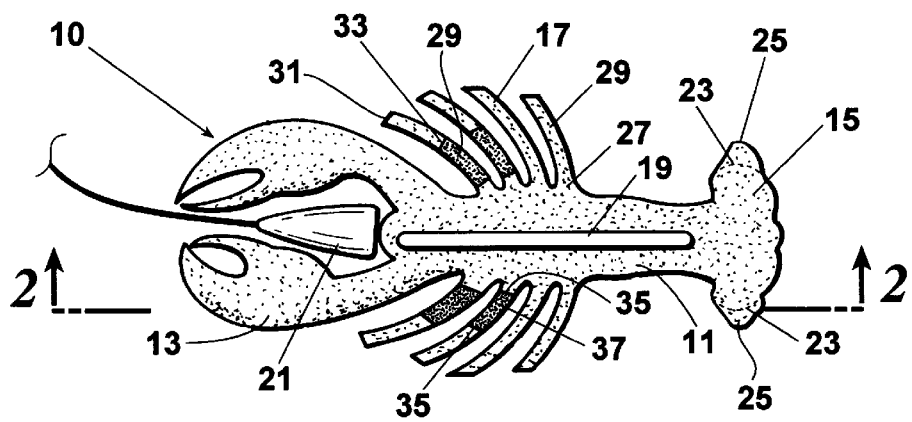
FIG. 1 is a top plan view of a crawfish embodiment of the present artificial bait.
Figure 2:
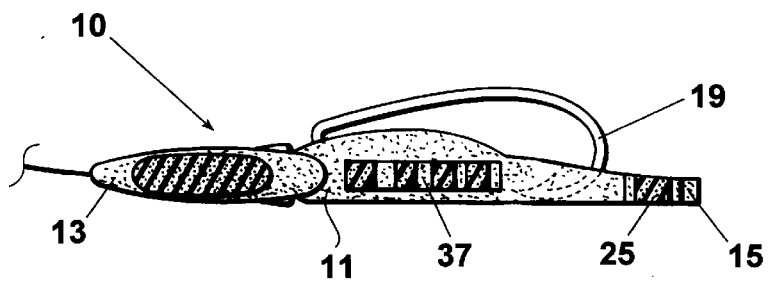
FIG. 2 is a cross-sectional view taken along the line 2—2 of FIG. 1.
Figure 3:
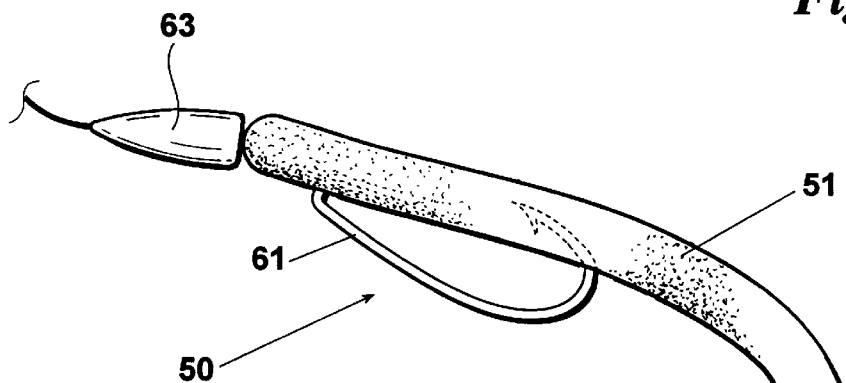
FIG. 3 is a side elevational view of a worm embodiment of the present artificial bait.

Looking at FIGS. 1 and 2, the bait material is formed in the shape of a crawdad 10 having a main body portion 1 1, claws 13, a tail fan 15 and legs 17. The buoyancy of the bait 10 is counterbalanced by the sinking weight of the hook 19 and jig head 21. For a properly selected counterbalancing threshold weight of the hook 19 and jig 21, the combination will provide a predetermined base drop rate when immersed in water.

If the angler is unsuccessful using the combination at its base drop rate, the drop rate can be increased by removal of a segment or segments of the bait material. In order to permit accurate control of the change in drop rate, appropriate segments to be broken away are delineated on the bait material. As shown in FIG. 1, the delineation may be accomplished, for example, by perforating the material as indicated by the perforation lines 23 delineating breakaway segments 25 from the tail fan 15. Alternatively, the breakaway segment can be delineated by distinct changes in contour of the bait material, such as by the junction point 27 of the leg 29 with the main segment of the body 11. The breakaway segments may also be delineated by a change in color on the surface of the bait material, such as a first colored breakaway segment 29 and a second differently colored breakaway segment 31 as illustrated on one of the legs 33. Finally, the breakaway segments may be delineated by solid or dotted lines 35 dividing the body or an appendage such as a leg 37 into segments.

In reference to FIG. 1, it can be seen that the breakaway segments can be independently connected to the main segment 11, as in the case of the breakaway tail fan segments 25. However, the breakaway segments can be serially connected as indicated with respect to the multi-colored leg 33. In this embodiment, the angler could, in a single step, remove one or two breakaway segments 31 and 29 from the main segment 11. It is also apparent from FIG. 1 that the body portion of the simulated natural bait can be used as a main segment while appendages of the simulated natural bait may serve as the breakaway segments.

In practice, it may be desirable to delineate the breakaway segments so that they are volumetrically equal, so that an accompanying chart would indicate the drop rate depending on the number of the volumetrically equal segments removed. On the other hand, the breakaway segments could be so volumetrically coordinated as to provide a proportional change in drop rates so that the angler would know, for example, that the drop rate would be increased by one inch per second if breakaway segments were removed in a particular designated sequence according to their change in volume.

Turning to FIG. 3, the bait material has been formed into a simulated worm 50 having a main segment 51 as a body portion and a plurality of breakaway segments 53, 55, 57 and 59 serially connected as the tail of the main segment 51. The buoyancy of this bait material is counterbalanced by the sinking weight of the hook 61 and jig head 63. The delineating lines 65 defining the breakaway segments 53, 55, 57 and 59 may be the result of perforation, color change or dashed or dotted lines as hereinbefore described with respect to the crawdad 10. The worm configuration 50 is particularly suited to permit an angler to rapidly achieve a desired drop rate by a single tear or cut to remove the necessary number of breakaway segments from the main segment of the bait.

Figure 4:
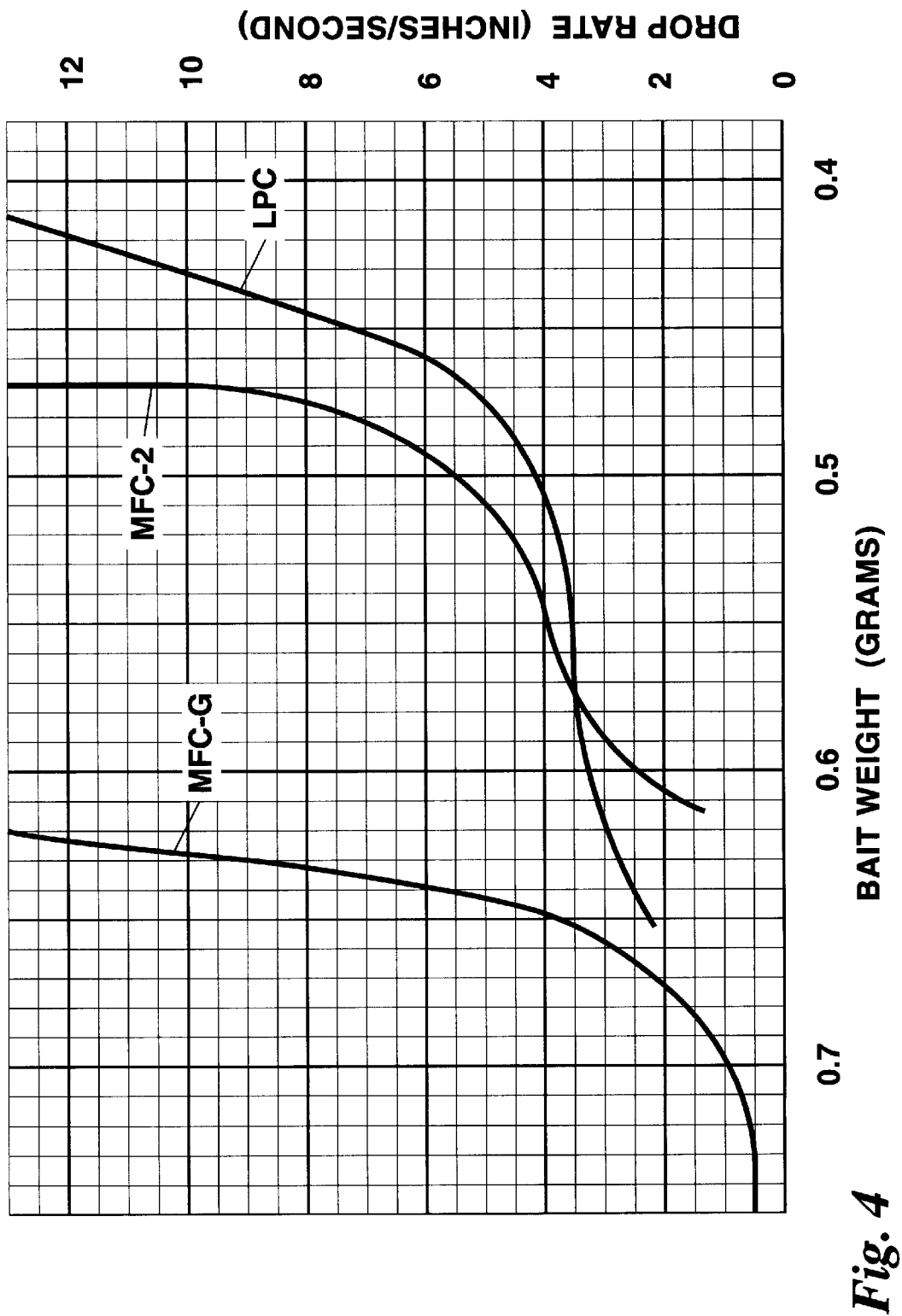
FIG. 4 is a graphic illustration of typical bait weight to drop rate relationships for a variety of artificial bait materials.

Looking at FIG. 4, bait weight to drop rate relationships determined by empirical approximation are illustrated for three different bait materials used in combination with a hook weight of one-half ounce. For Uniroyal MFC-G, the drop rate for a bait of 0.73 grams is approximately ½ inch per second. Removal of a 0.03 gram segment would increase the drop rate to approximately one inch per second. Removal of an additional 0.02 gram segment increases the drop rate to approximately 1½ inches per second. Removal of yet another 0.01 gram segment increases the drop rate to approximately two inches per second. As further segments are removed, the drop rate tends to increase rapidly. For Uniroyal MFC-2, the range of bait weights over which useful drop rate control occurs is greater than for the Uniroyal MFC-G. Uniroyal LPC demonstrates the widest range of control of these three materials. Other materials are identified in my earlier U.S. Pat. No. 5,438,790 but any material providing a counterbalancing buoyancy to the hook weight could be used as long as the drop rate curve satisfies the requirements of an individual user.

Clearly, any known natural bait can be simulated by the bait material and breakaway delineations in any known manner to result in predetermined drop rates for the bait and its threshold counterbalancing weight.

Thus it is apparent that there has been provided, in accordance with the invention, an artificial bait with breakaway segments for selectable drop rates that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. An artificial bait comprising:
 a body shaped to simulate a natural bait and having a predetermined base drop rate when immersed in water with a threshold weight attached thereto; and
 a change in color on a surface of said body for delineating a breakaway segment from a main segment thereof, said main segment of said body having a predetermined drop rate faster than said predetermined base drop rate when immersed in water with the threshold weight attached thereto and said breakaway segment removed therefrom.

2. An artificial bait comprising:
 a body shaped to simulate a natural bait and having a predetermined base drop rate when immersed in water with a threshold weight attached thereto; and
 a line on a surface of said body for delineating a breakaway segment from a main segment thereof, said main segment of said body having a predetermined drop rate faster than said predetermined base drop rate when immersed in water with the threshold weight attached thereto and said breakaway segment removed therefrom.

3. An artifficial bait comprising:
 a body shaped to simulate a natural bait and having a predetermined base drop rate when immersed in water with a threshold weight attached thereto; and
 a perforation in said body for delineating a breakaway segment from a main segment thereof, said main segment of said body having a predetermined drop rate faster than said predetermined base drop rate when immersed in water with the threshold weight attached thereto and said breakaway segment removed therefrom.

4. An artificial bait comprising:
 a body shaped to simulate a natural bait and having a predetermined base drop rate when immersed in water with a threshold weight attached thereto; and
 means on said body for delineating a plurality of breakaway segments from a main segment thereof, said breakaway segments being volumetrically equal whereby, upon removal of any number of said plurality of breakaway segments from said main segment and immersion in water with the threshold weight attached thereto, said body together with unremoved ones of said plurality of breakaway segments has a predetermined drop rate correspondingly faster than said predetermined base drop rate according to said number of breakaway segments removed therefrom.

5. An artificial bait comprising:

a body shaped to simulate a natural bait and having a predetermined base drop rate when immersed in water with a threshold weight attached thereto; and means on said body for delineating a plurality of breakaway segments from a main segment thereof, said breakaway segments being volumetrically coordinated to provide a proportional change in drop rates as said breakaway segments are removed from said main segment whereby, upon removal of any number of said plurality of breakaway segments from said main segment and immersion in water with the threshold weight attached thereto, said body together with unremoved ones of said plurality of breakaway segments has a predetermined drop rate correspondingly faster than said predetermined base drop rate according to said number of breakaway segments removed therefrom.

6. An artificial bait comprising:

a body shaped to simulate a natural bait and having a predetermined base drop rate when immersed in water with a threshold weight attached thereto; and a plurality of changes in color on a surface of said body for delineating a plurality of breakaway segments from a main segment thereof, said breakaway segments being volumetrically calibrated whereby, upon removal of any number of said plurality of breakaway segments from said main segment and immersion in water with the threshold weight attached thereto, said body together with unremoved ones of said plurality of breakaway segments has a predetermined drop rate correspondingly faster than said predetermined base drop rate according to said number of breakaway segments removed therefrom.

7. An artificial bait comprising:

a body shaped to simulate a natural bait and having a predetermined base drop rate when immersed in water with a threshold weight attached thereto; and a plurality of lines on a surface of said body for delineating a plurality of breakaway segments from a main segment thereof, said breakaway segments being volumetrically calibrated whereby, upon removal of any number of said plurality of breakaway segments from said main segment and immersion in water with the threshold weight attached thereto, said body together with unremoved ones of said plurality of breakaway segments has a predetermined drop rate correspondingly faster than said predetermined base drop rate according to said number of breakaway segments removed therefrom.

8. An artificial bait comprising:

a body shaped to simulate a natural bait and having a predetermined base drop rate when immersed in water with a threshold weight attached thereto; and a plurality of perforations in said body for delineating a plurality of breakaway segments from a main segment thereof, said breakaway segments being volumetrically calibrated whereby, upon removal of any number of said plurality of breakaway segments from said main segment and immersion in water with the threshold weight attached thereto, said body together with unremoved ones of said plurality of breakaway segments has a predetermined drop rate correspondingly faster than said predetermined base drop rate according to said number of breakaway segments removed therefrom.

\* \* \* \* \*